United States Patent
Grace et al.

(10) Patent No.: US 7,885,926 B2
(45) Date of Patent: Feb. 8, 2011

(54) SYSTEM AND APPARATUS FOR WIRELESS SYNCHRONIZATION OF MULTIMEDIA CONTENT

(75) Inventors: James R. Grace, Royal Oak, MI (US); Robert M. Riley, Jr., Albuquerque, NM (US); James M. Kortge, Ferndale, MI (US); Scott A. Rush, Plymouth, MI (US); Michael S. Schwartz, Mölnlycke (SE)

(73) Assignee: GM Global Technology Operations LLC, Detroit, MI (US)

( * ) Notice: Subject to any disclaimer, the term of this patent is extended or adjusted under 35 U.S.C. 154(b) by 459 days.

(21) Appl. No.: 11/036,213

(22) Filed: Jan. 14, 2005

(65) Prior Publication Data

US 2005/0262146 A1 Nov. 24, 2005

Related U.S. Application Data

(60) Provisional application No. 60/538,043, filed on Jan. 21, 2004.

(51) Int. Cl.
*G06F 7/14* (2006.01)
(52) U.S. Cl. .......................... 707/624; 701/36; 713/340
(58) Field of Classification Search ........................ None
See application file for complete search history.

(56) References Cited

U.S. PATENT DOCUMENTS

| | | | | |
|---|---|---|---|---|
| 5,339,446 A | * | 8/1994 | Yamasaki et al. | 713/340 |
| 5,341,503 A | * | 8/1994 | Gladstein et al. | 713/340 |
| 5,442,553 A | | 8/1995 | Parrillo | |
| 5,727,202 A | * | 3/1998 | Kucala | 707/10 |
| 5,822,600 A | * | 10/1998 | Hallowell et al. | 713/340 |
| 5,952,937 A | * | 9/1999 | Koopman et al. | 340/825.72 |
| 5,969,283 A | | 10/1999 | Looney et al. | |
| 6,026,340 A | | 2/2000 | Corrado et al. | |
| 6,034,621 A | * | 3/2000 | Kaufman | 340/7.21 |
| 6,134,283 A | * | 10/2000 | Sands et al. | 375/354 |
| 6,233,519 B1 | | 5/2001 | Yamada | |
| 6,248,946 B1 | | 6/2001 | Dwek | |
| 6,292,741 B1 | | 9/2001 | Bitzer et al. | |
| 6,332,086 B2 | * | 12/2001 | Avis | 455/574 |
| 6,374,177 B1 | * | 4/2002 | Lee et al. | 701/200 |

(Continued)

OTHER PUBLICATIONS

Bowman, et al. "MusicVis: A Visual Interface for Playlist Generation." Columbia Univeristy, 2001. URL: <http://www1.cs.columbia.edu/~paley/spring03/assignments/HWFINAL/bgb10/MusicVis_Poster.pdf.>.

(Continued)

*Primary Examiner*—James Trujillo
*Assistant Examiner*—Hubert Cheung
(74) *Attorney, Agent, or Firm*—Ingrassia Fisher & Lorenz, P.C.

(57) ABSTRACT

Apparatus is provided for an electronic vehicle storage system. The apparatus includes a data storage device configured to store multimedia files, a wireless transceiver configured to transfer multimedia files, and a controller coupled to the wireless transceiver, data storage device, and a vehicle electrical infrastructure. The data storage device has an embedded database containing a first list of multimedia files. The controller is configured to communicate with an external computing device via the wireless transceiver. The external computing device has a second list of multimedia files. The controller is further configured to synchronize the first list of multimedia files with the second list of multimedia files.

14 Claims, 2 Drawing Sheets

U.S. PATENT DOCUMENTS

| | | | |
|---|---|---|---|
| 6,470,358 B1* | 10/2002 | Beyda et al. | 707/201 |
| 6,539,395 B1 | 3/2003 | Gjerdingen et al. | |
| 6,546,456 B1 | 4/2003 | Smith et al. | |
| 6,587,759 B2 | 7/2003 | Obradovich et al. | |
| 6,603,698 B2* | 8/2003 | Janzen | 365/222 |
| 6,728,729 B1 | 4/2004 | Jawa et al. | |
| 6,775,603 B2 | 8/2004 | Yester et al. | |
| 6,820,230 B2 | 11/2004 | Sweeney | |
| 6,987,221 B2 | 1/2006 | Platt | |
| 7,010,808 B1 | 3/2006 | Leung et al. | |
| 7,039,821 B1* | 5/2006 | Potega | 713/340 |
| 7,043,477 B2* | 5/2006 | Mercer et al. | 707/7 |
| 7,058,484 B1* | 6/2006 | Potega | 700/297 |
| 7,058,814 B1* | 6/2006 | Zimmerman | 713/178 |
| 7,062,338 B1 | 6/2006 | Auflick et al. | |
| 7,069,510 B2 | 6/2006 | Anderson et al. | |
| 7,127,623 B2* | 10/2006 | Potega | 713/300 |
| 7,171,291 B2 | 1/2007 | Obradovich | |
| 7,181,297 B1* | 2/2007 | Pluvinage et al. | 700/94 |
| 7,203,847 B2* | 4/2007 | Park | 713/300 |
| 7,206,775 B2 | 4/2007 | Kaiser et al. | |
| 7,243,104 B2 | 7/2007 | Bill | |
| 7,254,096 B2 | 8/2007 | Watanabe | |
| 7,277,766 B1 | 10/2007 | Khan et al. | |
| 7,343,414 B2* | 3/2008 | Lipscomb et al. | 709/226 |
| 7,346,687 B2* | 3/2008 | Lipscomb et al. | 709/226 |
| 7,398,524 B2 | 7/2008 | Shapiro | |
| 7,472,001 B2 | 12/2008 | Grace et al. | |
| 7,525,289 B2* | 4/2009 | Janik et al. | 320/158 |
| 7,650,513 B2 | 1/2010 | Grace et al. | |
| 7,716,220 B2 | 5/2010 | Michelitsch et al. | |
| 2001/0012760 A1* | 8/2001 | Avis | 455/13.2 |
| 2002/0034973 A1* | 3/2002 | Avis | 455/574 |
| 2002/0065564 A1* | 5/2002 | Sheriff et al. | 700/11 |
| 2002/0087625 A1* | 7/2002 | Toll et al. | 709/203 |
| 2002/0174243 A1* | 11/2002 | Spurgat et al. | 709/231 |
| 2002/0194468 A1* | 12/2002 | Betts-LaCroix et al. | 713/100 |
| 2003/0018975 A1* | 1/2003 | Stone | 725/105 |
| 2003/0060728 A1 | 3/2003 | Mandigo | |
| 2003/0109241 A1 | 6/2003 | Kim | |
| 2003/0114133 A1* | 6/2003 | Enners | 455/344 |
| 2003/0182315 A1 | 9/2003 | Plastina et al. | |
| 2003/0215102 A1* | 11/2003 | Marlowe | 381/77 |
| 2004/0021351 A1* | 2/2004 | House | 297/217.4 |
| 2004/0029621 A1* | 2/2004 | Karaoguz et al. | 455/574 |
| 2004/0036625 A1 | 2/2004 | Omata et al. | |
| 2004/0055448 A1 | 3/2004 | Byon | |
| 2004/0151327 A1* | 8/2004 | Marlow | 381/86 |
| 2004/0158860 A1 | 8/2004 | Crow | |
| 2004/0225519 A1 | 11/2004 | Martin | |
| 2004/0237759 A1 | 12/2004 | Bill | |
| 2004/0242224 A1* | 12/2004 | Janik et al. | 455/426.1 |
| 2004/0264709 A1* | 12/2004 | Yona | 381/86 |
| 2005/0021398 A1* | 1/2005 | McCleskey et al. | 705/14 |
| 2005/0097137 A1 | 5/2005 | Kaiser et al. | |
| 2005/0131595 A1 | 6/2005 | Luskin et al. | |
| 2005/0144237 A1* | 6/2005 | Heredia et al. | 709/206 |
| 2005/0172154 A1 | 8/2005 | Short et al. | |
| 2005/0195975 A1 | 9/2005 | Kawakita | |
| 2006/0005055 A1* | 1/2006 | Potega | 713/300 |
| 2006/0010167 A1 | 1/2006 | Grace et al. | |
| 2006/0029109 A1 | 2/2006 | Moran | |
| 2006/0194549 A1* | 8/2006 | Janik et al. | 455/73 |
| 2006/0206492 A1* | 9/2006 | Lipscomb et al. | 707/10 |
| 2006/0206493 A1* | 9/2006 | Lipscomb et al. | 707/10 |
| 2006/0206582 A1* | 9/2006 | Finn | 709/217 |
| 2007/0025367 A1* | 2/2007 | Wijnands | 370/401 |
| 2008/0039108 A1* | 2/2008 | Shapira | 455/450 |
| 2009/0228570 A1* | 9/2009 | Janik et al. | 709/217 |

OTHER PUBLICATIONS

Timblin, R., Office Action mailed Mar. 16, 2010 for U.S. Appl. No. 11/172,381, filed Jun. 30, 2005.

Restriction Requirement dated Jun. 27, 2008, issued in U.S. Appl. No. 11/172,619.

Response to Restriction Requirement dated Jul. 15, 2008, filed in U.S. Appl. No. 11/172,619.

Notice of Allowance dated Sep. 8, 2008, issued in U.S. Appl. No. 11/172,619.

Office Action dated Feb. 2, 2009, issued in U.S. Appl. No. 11/172,380.

Response to Office Action dated Apr. 29, 2009, filed in U.S. Appl. No. 11/172,380.

Notice of Allowance dated Sep. 18, 2009, issued in U.S. Appl. No. 11/172,380.

Office Action dated Apr. 3, 2008, issued in U.S. Appl. No. 11/172,381.

Response to Office Action dated Jun. 27, 2008, filed in U.S. Appl. No. 11/172,381.

Office Action dated Aug. 11. 2008, issued in U.S. Appl. No. 11/172,381.

Final Office Action dated Sep. 11, 2008, issued in U.S. Appl. No. 11/172,381.

Response to Final Office Action dated Dec. 10, 2008, filed in U.S. Appl. No. 11/172,381.

Office Action dated Feb. 24, 2009, issued in U.S. Appl. No. 11/172,381.

Response to Office Action dated May 12, 2009, filed in U.S. Appl. No. 11/172,381.

Final Office Action dated Jul. 23, 2009, issued in U.S. Appl. No. 11/172,381.

Response to Final Office Action dated Oct. 12, 2009, filed in U.S. Appl. No. 11/172,381.

Office Action dated Oct. 29, 2009, issued in U.S. Appl. No. 11/172,381.

Response to Office Action dated Jan. 20, 2010, filed in U.S. Appl. No. 11/172,381.

Response to Office Action dated May 6, 2010, filed in U.S. Appl. No. 11/172,381.

Office Action dated Jun. 17, 2010, issued in U.S. Appl. No. 11/172,381.

Response to Office Action dated Sep. 10, 2010, filed in U.S. Appl. No. 11/172,381.

Sweet, M. "MusicMatch Loads Up The Jukebox," Aug. 2003, vol. 14, Issue 8. http://www.smartcomputing.com/editorial/article.asp?article=articles%2F2003%2Fs1408%2F04s08d%2F04s08d.asp.

"iTunes for Windows." http://www.simonbrown.je/blog/2003/11/01/itunes_for_windows.html. Nov. 1, 2003.

Office Action dated Oct. 6, 2010, issued in U.S. Appl. No. 11/172,381.

* cited by examiner

SYSTEM AND APPARATUS FOR WIRELESS SYNCHRONIZATION OF MULTIMEDIA CONTENT

CROSS-REFERENCE TO RELATED APPLICATION

This application claims the benefit of U.S. Provisional Application No. 60/538,043, filed Jan. 21, 2004.

TECHNICAL FIELD

The present invention generally relates to transfer and storage of multimedia information in a motor vehicle, and more particularly relates to the use of a hard disk drive and applications of a hard disk drive in a motor vehicle.

BACKGROUND

Vehicle operators tend to spend a significant amount of time in their vehicles particularly when commuting from a home to a workplace, running errands, conducting business, vacationing, or for many other reasons. This time is significant enough that some vehicles come equipped with a variety of consumer electronics such as compact disc (CD) players, cassette tape players, radios, satellite radios, electronic gaming, and digital video disc (DVD) players. Some owners may also choose to equip their vehicle with aftermarket consumer electronics in the event their vehicles lack such consumer electronics or for purposes of customization. These and other entertainment or infotainment electronic devices provide a passenger in the vehicle with time-occupying options and may improve the passenger's quality of time.

Consumer electronics such as CD players, cassette tape players, DVD players, and electronic gaming generally have related media content for playback residing on a localized storage medium. For example, many on-board navigation systems utilize geographic information stored on CD's. This information may be downloaded to a memory specifically associated with the navigation system, located in the vehicle, or directly accessed from the CD by the navigation system. In another example, CD players commonly play media that is stored on CD. Most of these playback devices can accept a limited number of storage media during operation and thereby generally have a relatively limited capacity of media selection. For example, a CD player with a six (6) disc CD changer has a selection of music tracks that are limited to any six CD's contained in the CD changer.

Many households maintain a media collection on home personal computers (PCs). For example, back-up copies of media stored on CD's may be downloaded to a home PC. Additionally, a variety of compressed digital audio formats, as well as video formats, may be downloaded to the home PC, such as through a web-based music subscription, to further contribute to the media collection.

Accordingly, it is desirable to provide a multimedia data storage system for a vehicle that stores a variety of multimedia files therein and that may be synchronized with multimedia files stored on a home PC. In addition, it is desirable to provide an electronic vehicle storage system having stored multimedia files that may be synchronized with multimedia files stored on a home PC triggered by an action, such as a key fob button press. Furthermore, it is desirable to provide a hard disk drive for a vehicle having embedded content corresponding to downloadable multimedia files that may be synchronized with a remote data storage device while preserving vehicle battery power. Finally, other desirable features and characteristics of the present invention will become apparent from the subsequent detailed description and the appended claims, taken in conjunction with the accompanying drawings and the foregoing technical field and background.

BRIEF SUMMARY

An apparatus is provided for an embedded hard drive infotainment system. In a first exemplary embodiment, an electronic vehicle storage system is provided having a data storage device configured to store multimedia files, a wireless transceiver configured to transfer multimedia files, and a controller coupled to the wireless transceiver, data storage device, and a vehicle electrical infrastructure. The data storage device has an embedded database containing a first list of multimedia files. The controller is configured to communicate with an external computing device via the wireless transceiver. The external computing device has a second list of multimedia files. The controller is further configured to synchronize the first list of multimedia files and the associated content with the second list of multimedia files.

In a second exemplary embodiment, a vehicle multimedia data storage system is provided. The vehicle multimedia data storage system has a wireless transceiver configured to transfer multimedia files, a data storage device configured to store multimedia files, and a controller coupled to the data storage device, the wireless transceiver, and a vehicle electrical infrastructure. The data storage device has an embedded database having a first list of multimedia files. The controller is configured to determine an available power supply, and synchronize the first list of multimedia files with a second list of multimedia files via the wireless transceiver based on the available power supply.

In a third exemplary embodiment, an infotainment system is provided for a motor vehicle. The infotainment system has a hard drive having an embedded database containing a first list of multimedia files, a wireless transceiver configured to transfer multimedia files, a playback device configured to playback multimedia files stored on a portable storage medium, and a controller coupled to the hard drive, the wireless transceiver, and the playback device. The hard drive is further configured to store multimedia files from the playback device in the embedded database. The first list of multimedia files is based on the multimedia files from the playback device. The controller is configured to synchronize the first list of multimedia files with a second list of multimedia files via the wireless transceiver.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
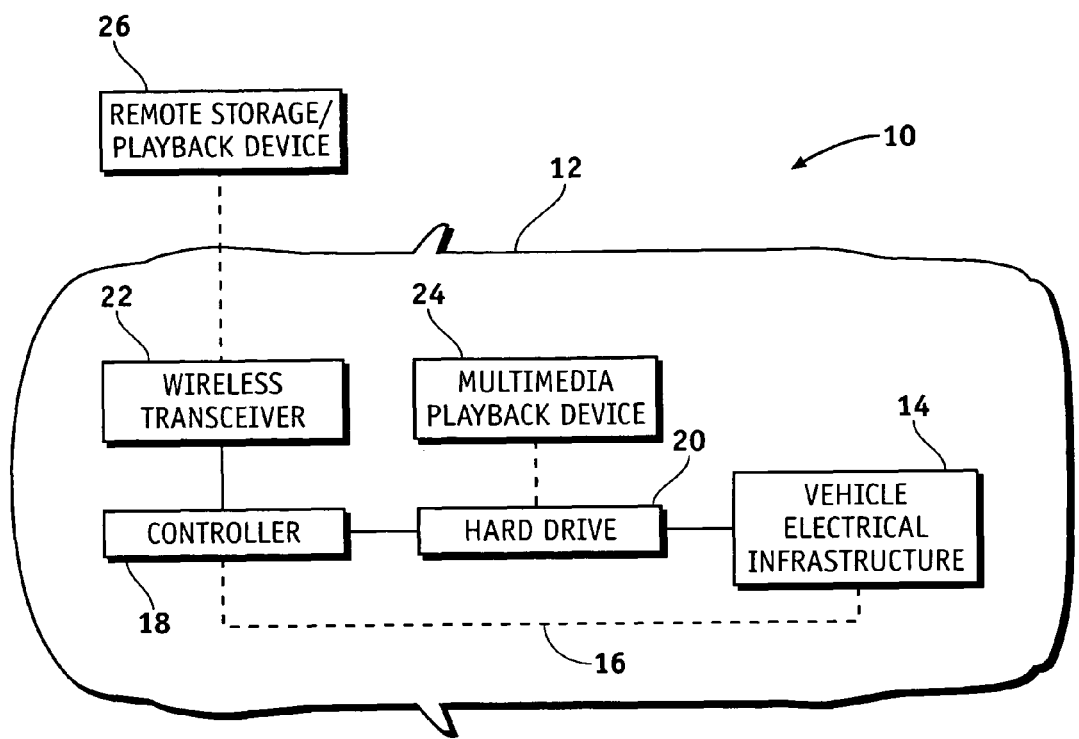
FIG. 1 is a schematic diagram illustrating a first exemplary embodiment of an electronic vehicle storage system in a vehicle.

Referring to the drawings, FIG. 1 is a schematic diagram illustrating a first exemplary embodiment of an electronic vehicle storage system 10 in a vehicle 12. In a more basic exemplary embodiment, the electronic vehicle storage system 10 includes a vehicle electrical infrastructure 14, a vehicle communications network 16 coupled to the vehicle electrical infrastructure 14, a controller 18 coupled to the vehicle electrical infrastructure 14, such as via the vehicle communications network 16, and a data storage device 20 coupled to the controller 18 and configured to store multimedia files.

The data storage device 20 and controller 18 are integrated in the vehicle 12. The controller 18 communicates with the vehicle electrical infrastructure 14, such as to receive current status information regarding various vehicle electrical systems/subsystems, as described in greater detail hereinafter. The data storage device 20 includes an embedded database containing a list of content that may be accessed by the controller 18 to associate a recognized multimedia file with a corresponding content from the list of content. A variety of multimedia storage/playback devices may be directly coupled to the electronic vehicle storage system 10, such as a multimedia playback 24 device located in the vehicle 12 (e.g., in-dash radio receiver and CD player) or a portable storage/playback device (e.g., MP3 player) via a universal serial bus (USB) connection, firewire, or other conventional one-way or two-way communication line. Additionally, a remote storage/playback device 26 may be wirelessly coupled with the electronic vehicle storage system 10, as described in greater detail hereinafter. The electronic vehicle storage system 10 provides a user with access to generally more audio or other multimedia content than found in conventional CD players.

As used herein, the term "file" refers to any data that is stored at one or more sources and is to be delivered as a unit to one or more destinations. For example, a document, an image, and a file from a file server or computer storage device, are all examples of "files" that may be delivered. Files can be of known size (such as a one megabyte image stored on a hard disk) or can be of unknown size (such as a file taken from the output of a streaming source).

The vehicle electrical infrastructure 14 may include various systems and/or subsystems on the vehicle 12, including by way of example and not of limitation a human vehicle interface, a battery power management system, an engine management system, a transmission management system, a body control module, and vehicle subsystems such as an antilock brake system (ABS). The data storage device 20 and controller 18 communicate over the vehicle communications network, such as controller area network (CAN) and J1850 type communication protocols, to transfer information to and from the vehicle systems and subsystems.

In one exemplary embodiment, the data storage device 20 is a hard disk drive, or hard drive, that has at least one platter/disk (not shown) accessed by a read/write head(s) (not shown) to transfer data from/to the platter/disk. The hard drive 20 may store a variety of data including, but not limited to, multimedia files, such as audio files, and a variety of status and diagnostic information from the various systems and subsystems of the vehicle 12, such as antilock brake system (ABS) status information. The hard drive 20 is located in the vehicle 12 and is wired to the vehicle electrical infrastructure 14, such as via the controller 18. Although the data storage device 20 is described herein in the context of a hard drive, a variety of other types of mass storage devices may also be used that have read/write operations.

As previously mentioned, the controller 18, such as a microprocessor or other conventional processing device, is coupled to the hard drive 20 to access information on the hard drive 20, direct transfer of information to/from the hard drive 20, and optionally communicate with various systems and/or subsystems on the vehicle 12. Although the controller 18 is shown as a separate device from the hard drive 20, the combined configuration of the controller 18 and hard drive 20 is not critical to the electronic vehicle storage system 10. For example, in another exemplary embodiment, the hard drive 20 incorporates the controller 18 such that the hard drive 20 and controller 18 are a single module.

The hard drive 20 may optionally communicate over a wireless network including, but not limited to, Wi-Fi, Bluetooth, a cellular network, or the like, to transfer information to and from remote systems, such as a key fob and a personal computer. In this embodiment, a wireless transceiver 22 is coupled to the controller 18. For example, the hard drive 20 communicates with a telematics provider, such as OnStar, to transfer information from a remote system using a cellular/satellite network and the Internet or other similar computer network. In another exemplary embodiment of the present invention, a radio transceiver is electronically coupled to the controller 18 to communicate over the previously mentioned wireless networks. The particular wireless network or transceiver is not critical to the operation of the electronic vehicle storage system 10 provided each is compatible with the other. Those of skill in the art will appreciate that the wireless transceiver 22 may be embodied by one or more of a variety of different conventional wireless receivers, transmitters, and transceivers to transfer information between the hard drive 20 and a remotely located (i.e., external to the vehicle) multimedia storage system/device.

Each multimedia file has a corresponding multimedia file content. More than one multimedia file may be stored in a portable storage medium, stored in the hard drive 20, transferred to/from the wireless transceiver 22, or otherwise processed by the various components of the electronic vehicle storage system 10. Examples of conventional portable storage medium include, by way of example and not limitation, CD, digital video disc (DVD), read-only memory (ROM), programmable ROM types, random access memory (RAM), floppy disk, magnetic tape, flash memory, hard disk, and the like.

In one exemplary embodiment, content from a CD, such as an in-dash CD player coupled to the data storage device 20 or a CD drive integrated with the data storage device, may be transferred to the data storage device 20. For example, the user may insert a normal audio CD and copy content from the CD on to the data storage device 20. The controller 18 recognizes the content of the CD using the embedded database to associate the CD with a list of the content on the CD. If a CD is inserted into the system 10 that is not recognized by the controller 18, a telematics connection is established by the controller 18 via the wireless transceiver 22 to a remote storage/playback device 26, such as a remote server. Information regarding the inserted CD, such as genre, artist, album, may be retrieved from a database on the server by the controller 18, downloaded to the hard drive 20, and stored with the embedded database. The embedded database may also be updated by receiving broadcast updates through the wireless transceiver 22 and downloading the updates to the hard drive 20. Content from a variety of other storage mediums may also be transferred to the hard drive 20, such as from a DVD player or an MP3 player.

Figure 2:
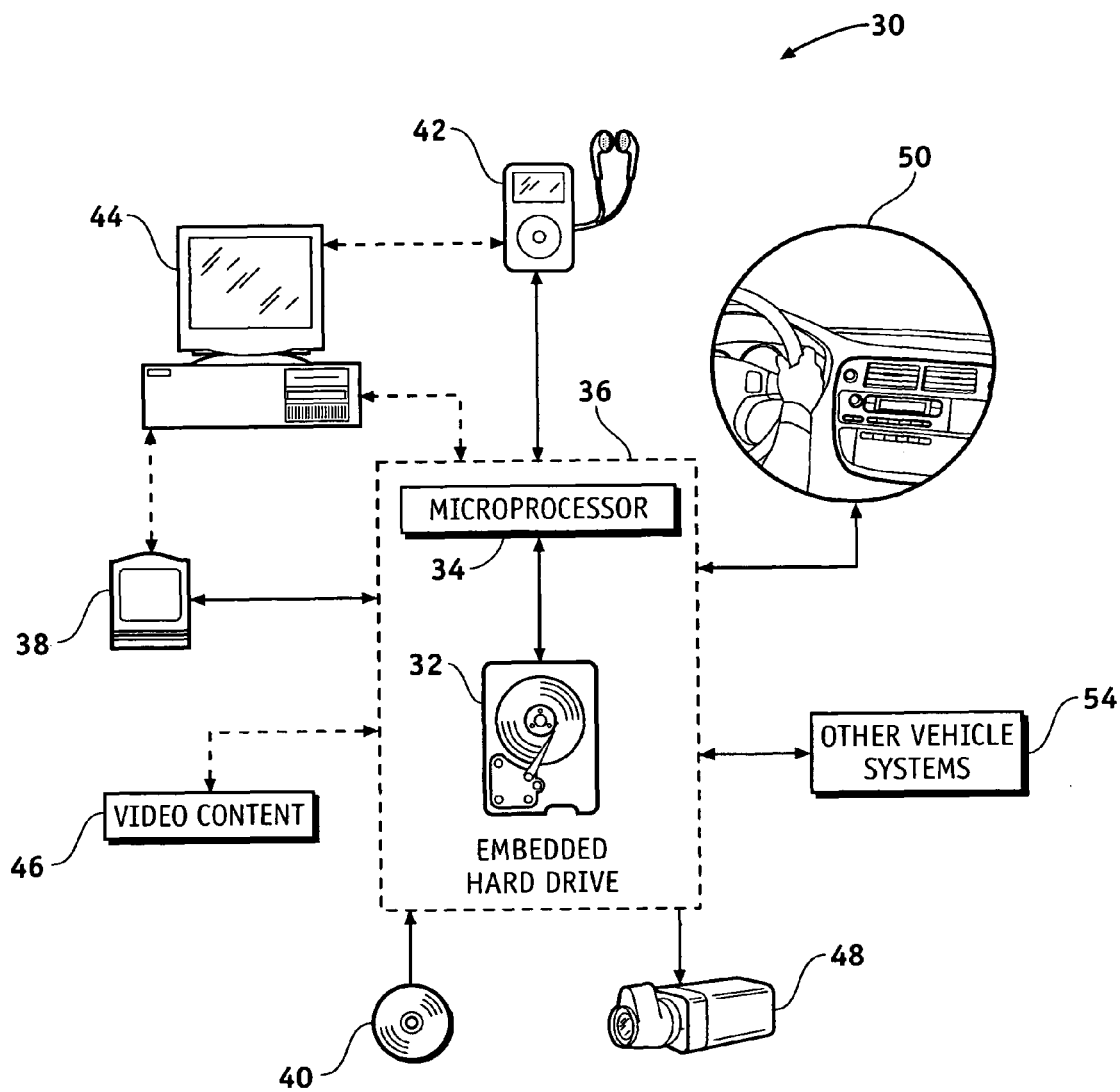
FIG. 2 is a block diagram of a second exemplary embodiment of electronic vehicle storage system.

FIG. 2 is a block diagram illustrating communication between components of an electronic vehicle storage system 30. In this embodiment, a hard drive 32, such as the hard drive 20 shown in FIG. 1, has an embedded database containing a list of multimedia file content. A controller 34, such as the controller 18 shown in FIG. 1, is a microprocessor that is coupled to the hard drive 32. Routing of communication from various components of the electronic vehicle storage system 30 to the data storage device 36 may vary between the hard drive 32 and the microprocessor 34.

For simplicity of explanation in this exemplary embodiment, the hard drive 32 and the microprocessor 34 are together referred to as a data storage device 36. For example, control signals may be communicated between the microprocessor 34 and the wireless transceiver 22 shown in FIG. 1, and multimedia files may be wirelessly transferred from a personal computer 44 (PC) to the hard drive 32. In this example, such control signal communication and multimedia file transfer together establish communication between the data storage device 36 and the personal computer 44. The particular routing of communication among the hard drive 32, the microprocessor 34, and other components of the electronic vehicle storage system 30 is not critical to the operation of the same.

The hard drive 32 stores multimedia files such as found on conventional CD's, DVD's, and other storage mediums. Multimedia files may be downloaded to the data storage device 36 from any number of devices. As best shown in FIG. 2, multimedia files may be downloaded to the data storage device 36 from a conventional CD 40, a compressed audio CD 38 that may be used to store compressed digital audio files such as MP3 files or the like, a portable storage/player device 42 such as a DVD player, a video content storage/player device 46 such as a digital video recorder (DVR), and a personal computer 44. In one exemplary embodiment, the multimedia files are stored as compressed files on the hard drive 32.

To preserve DRM protected multimedia files, a public key encoding system may be used to encrypt such multimedia files. For example, a vehicle identification number (VIN) may be used as the public key. In a wireless transfer configuration, the vehicle's public key may be transmitted over the wireless network to the remotely connected personal computer 44, portable storage/player device 42, or video content storage/player device 46 to be used for encrypting content. For an end-to-end DRM scheme, the vehicle, such as the vehicle 12 shown in FIG. 1, may authenticate using the VIN as the public key before transfer of content thereto while also preserving DRM protected content from subsequent transfer out of the vehicle 12.

Wireless transfer of multimedia files is accomplished using a wireless transceiver such as the wireless transceiver 22 shown in FIG. 1. In one exemplary embodiment, content may be synchronized between the electronic vehicle storage system 30 in the vehicle 12 (FIG. 1) and a remote storage/playback device 26 (FIG. 1) such as the home PC 44. For example, a music collection of audio files stored on the data storage device 36 may be synchronized with a music collection of audio files stored on the home PC 44. In this example, the microprocessor 34 may compare the content on the hard drive 32 with the content on the home PC 44 and transfer content acquired on the PC 44 to be transferred to the vehicle 12 (FIG. 1). In this exemplary embodiment, content that may have been "ripped" from purchased CD's onto the hard drive 32 may be transferred to the PC 44 from the PC 44 to the hard drive 32.

In one exemplary embodiment, the data storage device 36 may be coupled to one or more of a user interface 50, a battery power management system 52, a video system 48, and other vehicle systems 54 such as previously mentioned with respect to the vehicle 12 shown in FIG. 1. Wireless synchronization may be a power-intensive ignition-off operation. To manage ignition-off battery power to ensure vehicle start, wireless synchronization may be budgeted. In one exemplary embodiment, the microprocessor 32 may communicate with the battery power management system 52 to conserve battery power that may be used for wireless synchronization. For example, a pre-determined synchronization budget may be used by the microprocessor 32 to determine how much synchronization may occur before synchronization stops to conserve battery power. This budget may be based on units of power where a unit corresponds to a certain amount of synchronization time. The budget may be increased while the engine of the vehicle 12 (FIG. 1) is running and decreased during ignition-off as time passes and as synchronization occurs. Although the synchronization budget is described with regard to the battery power management system 52, the microprocessor 32 may interact with other vehicle systems 54 as well to determine available battery power for synchronization.

In another exemplary embodiment, wireless synchronization as controlled by the microprocessor 32 may be initiated upon detection by the microprocessor of a synchronization initiation signal, such as from a conventional key fob. In this embodiment, a radio frequency (RF) receiver 28 (FIG. 1) is coupled to the vehicle electrical infrastructure 14 (FIG. 1). Upon activation of the key fob, such as by a dedicated switch for synchronization initiation, door lock control, ignition-on, or otherwise, the RF receiver 28 receives the signal from the key fob. The microprocessor 32 may be configured to detect the receipt by the RF receiver 28 of the synchronization initiation signal.

Being coupled with other vehicle systems 54, the data storage device 36 may record diagnostic and status information to the hard drive 32 to record states as time passes. This embodiment is particularly useful as an automotive "black box" where the data storage device 36 may be recovered in the event of a crash of the vehicle 12 (FIG. 1) occurs. The status information of various vehicle systems 54 stored in the data storage device 36 may be used to determine information about the crash. Additionally, the data storage device 36 may record diagnostic information relevant to the vehicle history and service to the hard drive 32. This information may be used by service professionals when repairing or performing maintenance on the vehicle 12 (FIG. 1).

The user interface 50 displays the contents of the multimedia files stored on the hard drive 32, such as a music library, in the vehicle 12 (FIG. 1) and provides navigation, such as music navigation using a rotating knob or push button, among the multimedia files. In one exemplary embodiment, the data storage device 36 monitors and determines listening habits of the user, such as by associating an audio file with a corresponding content. Based on the determined listening habits, the microprocessor 34 may generate a playlist so that browsing by the user to a particular content is not necessary. In one example, a "one-touch" scheme may be used to automatically generate the playlist. The entire contents of the music library may be displayed such as on a display bar. For example, a current position within the music library may be marked using an indicator, such as a pointer, along the display bar. The user can move through the music library by rotating a knob counter clockwise and clockwise. The music library may be marked along the display bar by genres, artists, albums, etc. A softkey may also be used to "jump" to a specific place along the display bar. Although the user interface 50 is described herein with regard to the music library, a general multimedia library may also be displayed for navigation. The video system 48 may include a monitor and related electronics to display video images such as from content associated with a DVD.

In one exemplary embodiment, the user interface 50 provides controls to rip/copy an entire CD (compressed or normal), DVD, or other portable storage medium to the hard drive 34. In another exemplary embodiment, the user interface 50 provides controls to rip/copy specific tracks or files contained on the CD, DVD, or other portable storage medium. For example, during playback of the portable storage medium, the user may select a currently played track or file for ripping/copying to the hard drive 34. Additionally, the user interface 50 may provide a control to delete the currently played track or file from the hard drive 34. The user interface 50 displays the specific tracks or files that have been ripped/copied to the hard drive 34 from the portable storage medium. In this embodiment, the user has flexibility to selectively store and prune content recorded to the hard drive 34.

Rip or copy speed of multimedia files to the hard drive 34 may be limited due to shock and vibration while the vehicle 12 (FIG. 1) is in motion. In one exemplary embodiment, the hard drive 34 has a variable rip speed that dynamically adjusts based on vehicle movement. By coupling the microprocessor 36 to the various vehicle systems/subsystems, such as a body control module or throttle control module, the microprocessor 36 may increase or decrease rip speed based on status information communicated from such vehicle systems/subsystems. For example, the rip speed of the hard drive may be increased while the vehicle is not moving to maximize transfer speed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electronic vehicle storage system for a vehicle having an engine and an available power supply, said electronic vehicle storage system comprising:
    a data storage device configured to store multimedia files, said data storage device comprising an embedded database containing a first list of said multimedia files;
    a wireless transceiver configured to transfer said multimedia files; and
    a controller coupled to said wireless transceiver, said data storage device, and a vehicle electrical infrastructure, said controller configured to:
        communicate with an external computing device via said wireless transceiver, said external computing device comprising a second list of multimedia files;
        synchronize said first list of said multimedia files with said second list of said multimedia files, wherein said synchronization comprises transferring said multimedia files listed on said second list of said multimedia files but not on said first list of said multimedia files from said external computing device to said data storage device via said wireless transceiver, wherein said controller is further configured to synchronize said first list of said multimedia files with said second list of said multimedia files for a pre-determined synchronization time budget that is determined by said controller based upon said available power supply, and to stop synchronization after a pre-determined period of synchronization time has elapsed; and
        adjust said pre-determined synchronization time budget by increasing said pre-determined period of said synchronization time while said engine of said vehicle is running and by decreasing said pre-determined period of said synchronization time as time passes while said engine is not running and as said synchronization occurs.

2. The electronic vehicle storage system according to claim 1, wherein said data storage device is a hard disk drive; and
    wherein said multimedia files are compressed digital multimedia files.

3. The electronic vehicle storage system according to claim 1, wherein said controller is further configured to:
    detect a synchronization initiation signal via said vehicle electrical infrastructure prior to said synchronization of said first list of said multimedia files with said second list of said multimedia files.

4. The electronic vehicle storage system according to claim 3, further comprising a radio frequency (RF) receiver coupled to said vehicle electrical infrastructure; and
    wherein said synchronization initiation signal is a key fob signal received by said RF receiver.

5. The electronic vehicle storage system according to claim 1, further comprising a telematics transceiver coupled to said controller;
    wherein said embedded database further comprises a list of multimedia file content corresponding to said first list of said multimedia files;
    wherein said controller is further configured to associate a recognized multimedia file with a multimedia file content from said list of said multimedia file content; and
    wherein said telematics transceiver is configured to retrieve said multimedia file content corresponding to a non-recognized multimedia file.

6. The electronic vehicle storage system according to claim 5, further comprising a satellite receiver coupled to said data storage device, said satellite receiver configured to receive an updated list of multimedia file content, said data storage device further configured to store said updated list of said multimedia file content.

7. The electronic vehicle storage system according to claim 1, further comprising a media playback device coupled to said controller, said media playback device configured to transfer said multimedia files to said data storage device via said controller, said media playback device selected from a compact disc player, a magnetic tape player, a compressed digital audio player, a mini-disc player, and a digital video disc player.

8. The electronic vehicle storage system according to claim 1, wherein said external computing device is a personal computer having a memory configured to store said second list of said multimedia files.

9. The electronic vehicle storage system according to claim 1, wherein said controller is further configured to determine said pre-determined synchronization time budget based on an amount of said available power supply that provides sufficient power for a vehicle start.

10. The electronic vehicle storage system according to claim 9, further comprising a battery power management system, and wherein said controller is further configured to communicate with said battery power management system and to determine said available power supply based on said battery power management system.

11. An electronic vehicle storage system for a vehicle having an engine operating in conjunction with a vehicle electrical infrastructure having a battery, said electronic vehicle storage system comprising:
- a radio frequency (RF) receiver configured to provide a synchronization initiation signal in response to a signal received from a key fob;
- a data storage device configured to store multimedia files, said data storage device comprising an embedded database containing a first list of said multimedia files;
- a battery power management system coupled to said battery;
- a wireless transceiver configured to transfer said multimedia files; and
- a controller coupled to said wireless transceiver, said data storage device, and said vehicle electrical infrastructure, said controller configured:
  - to detect said synchronization initiation signal via said RF receiver;
  - to communicate with an external computing device via said wireless transceiver in response to said synchronization initiation signal, said external computing device comprising a second list of said multimedia files;
  - to communicate with said battery power management system to determine an available power supply;
  - to determine a synchronization time budget based upon said determined available power supply;
  - to synchronize said first list of said multimedia files with said second list of said multimedia files according to said determined synchronization time budget via said wireless transceiver;
  - to adjust said determined synchronization time budget by increasing said determined synchronization time budget while said engine of said vehicle is running and by decreasing said determined synchronization time budget as time passes during said synchronization while said engine is not running; and
  - to stop said synchronization when said determined synchronization time budget is expended.

12. The electronic vehicle storage system of claim 11, wherein said synchronization comprises transferring said multimedia files listed on said second list of said multimedia files but not on said first list of said multimedia files from said external computing device to said data storage device.

13. A method of operating an electronic vehicle storage system operating in conjunction with a vehicle electrical infrastructure providing an available power supply to a vehicle having an engine, wherein said electronic vehicle storage system comprises a wireless transceiver and a data storage device configured to store multimedia files and having an embedded database containing a first list of said multimedia files, said method comprising the steps of:
- communicating with an external computing device via said wireless transceiver, said external computing device comprising a second list of said multimedia files;
- determining a synchronization time budget based upon said available power supply and an amount of power needed to start said vehicle;
- increasing said determined synchronization time budget while said engine of said vehicle is running;
- synchronizing said first list of said multimedia files with said second list of said multimedia files based upon said determined synchronization time budget, wherein said synchronization comprises transferring said multimedia files listed on said second list of said multimedia files but not on said first list of said multimedia files from said external computing device to said data storage device via said wireless transceiver;
- decreasing said determined synchronization time budget as said synchronization occurs while said engine is not running; and
- stopping said synchronization when said determined synchronization time budget is expended.

14. The method of claim 13, wherein said decreasing comprises decreasing said determined synchronization time budget as time passes while said engine is not running and as said synchronization occurs.

* * * * *